United States Patent [19]

Su et al.

[11] Patent Number: 5,815,800

[45] Date of Patent: Sep. 29, 1998

[54] VOICE-PAGER SYSTEM

[75] Inventors: Lily Su; Sulton Su, both of Plano, Tex.

[73] Assignee: MCI Communication Corporation

[21] Appl. No.: 669,191

[22] Filed: Jun. 24, 1996

[51] Int. Cl.⁶ ............................... H04Q 7/10; H04Q 7/12
[52] U.S. Cl. ..................... 455/31.3; 455/31.2; 455/426; 30/825.44
[58] Field of Search .................................. 455/31.2, 31.3, 455/553, 426, 466, 413; 340/825.44; 379/88, 89

[56] References Cited

U.S. PATENT DOCUMENTS

| | | | |
|---|---|---|---|
| 4,885,557 | 12/1989 | Nelson | 455/31.2 |
| 4,965,569 | 10/1990 | Bennett et al. | 340/825.44 |
| 5,307,399 | 4/1994 | Dai et al. | 455/31.3 |
| 5,327,486 | 7/1994 | Wolff et al. | 379/88 X |
| 5,335,246 | 8/1994 | Yokev et al. | 340/825.44 |
| 5,390,362 | 2/1995 | Modjeska et al. | 340/825.44 X |
| 5,654,942 | 8/1997 | Akahane | 340/825.44 |
| 5,689,440 | 11/1997 | Leitch et al. | 455/70 |

*Primary Examiner*—Dwayne D. Bost
*Assistant Examiner*—Nay Maung

[57] ABSTRACT

A voice-pager system that facilitates reception of audio messages by a pager (or voice-pager). The voice-pager is similar to a telephone answering machine. The voice-pager system facilitates transference of greater information content because more information can be entered in a given period of time by a user by spoken voice than with a keyboard.

18 Claims, 5 Drawing Sheets

VOICE-PAGER SYSTEM

BACKGROUND OF THE INVENTION

1. Field of the Invention

The present invention relates generally to pager systems, and more specifically to pager systems that convey audio messages.

2. Related Art

Pager systems are communications devices that permit a first party to send messages electronically to a second party. Conventionally, the messages are projected in the form of text on a display of the pager of the second party. The messages are generally entered by the first party with a touch tone telephone keypad. The content of the messages is generally limited in scope, often to a telephone number or other brief data. Recently pagers have been introduced that also allow the second party to reply to the first party with one of a selection of messages that are pre-programmed into the pager.

SUMMARY OF THE INVENTION

The present invention is a voice-pager system that facilitates reception of audio messages by a pager (or voice-pager). The voice-pager is similar to an answering machine. The voice-pager system facilitates transference of greater information content because more information can be entered in a given period of time by a user by spoken voice than with a keypad.

One embodiment of the present invention permits the reception of audio and text messages. Another embodiment of the invention permits the reception and transmission of both audio and text messages.

It is a benefit of the present invention to facilitate efficient communications by receiving audio messages.

It is a further advantage of the present invention to permit the transmission of audio messages to other parties.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention is directed toward a pager system including a pager, or voice-pager, that can receive, and possibly transmit audio messages. In addition, the pager may receive, and possibly send text messages.

Figure 1:
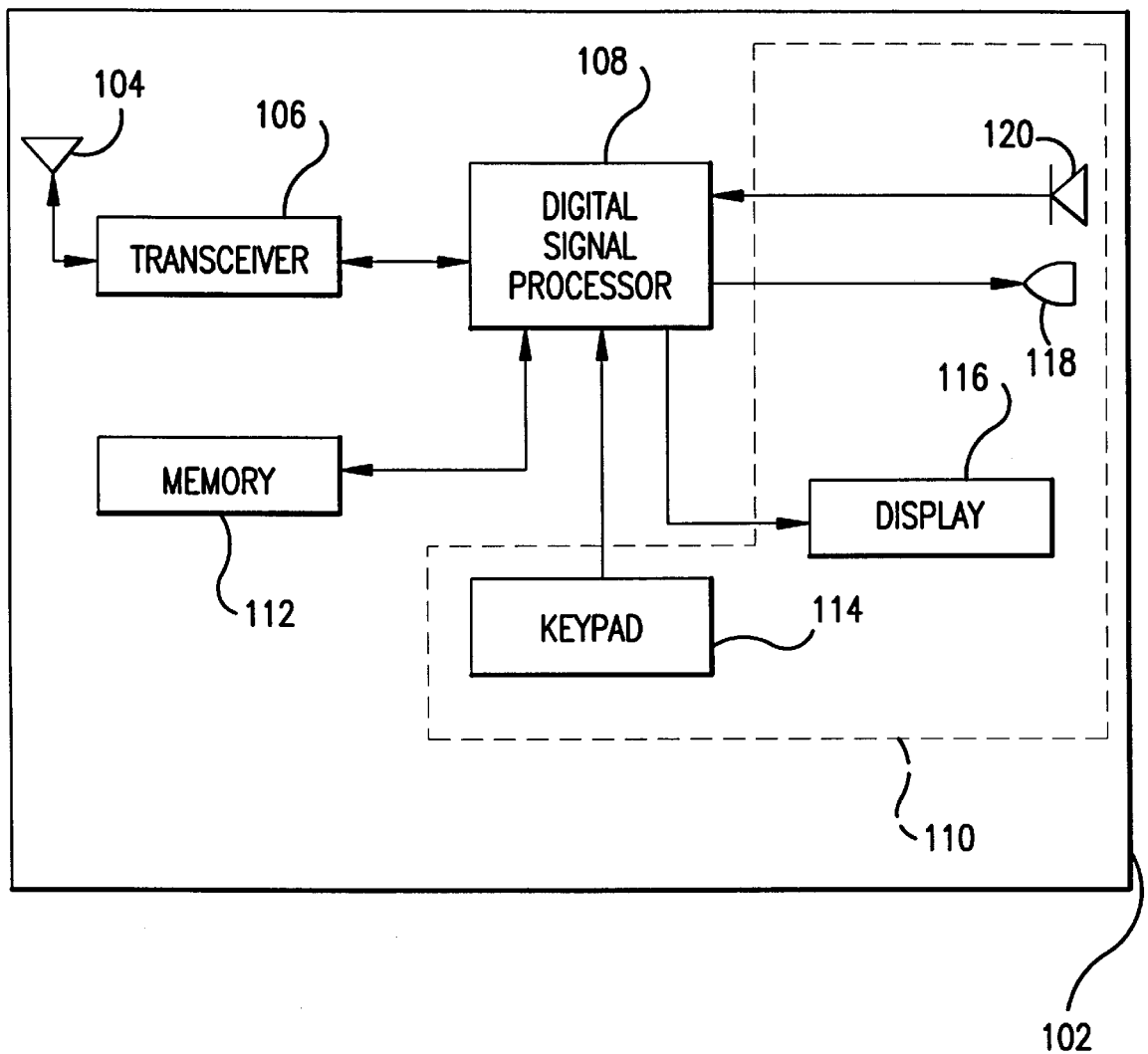
FIG. 1 illustrates an embodiment of a voice-pager.

FIG. 1 illustrates one embodiment of the pager of the present invention. This embodiment is of a pager 102 that can transmit and receive both text and audio messages.

The pager 102 includes an antenna 104 through which the pager 102 communicates with a remote paging service (not shown). A transceiver 106 is coupled to antenna 104. The transceiver 106 upconverts an audio or text message signal to a higher carrier frequency that is radiated by the antenna 104 to the paging service. The transceiver 106 also downconverts an audio or text message signal, broadcast from the paging service and captured by the antenna 104, to a lower carrier frequency.

The transceiver 106 is coupled to a digital signal processor (DSP) 108. The DSP 108 modulates and demodulates data (e.g., text and audio) respectively on and from the carrier frequency. Amplitude, frequency, phase, pulse position modulation or a combination thereof may be used in the present invention. The digital signal processor 108 may contain a coded (coder/decoder), an analog-to-digital converter, a bus, and filtering and other arithmetic processing capabilities. Implementation of the digital signal processor 108 would be apparent to one skilled in the art.

The digital signal processor 108 is also coupled to input/output devices 110 and memory 112. The input/output devices 110 may include a keypad 114, a display 116, a speaker 118, and a microphone 120. The memory 112 may include random access memory (RAM) and read only memory (ROM). Implementation of the input/output devices 110 and memory 112 would be apparent to one skilled in the art.

Text messages can be entered and shown respectively with the keypad 114 and display 116. Audio messages can be entered and heard respectively through the microphone 120 and speaker 118. Data, such as text or audio messages, may be saved in memory 112.

Figure 2:
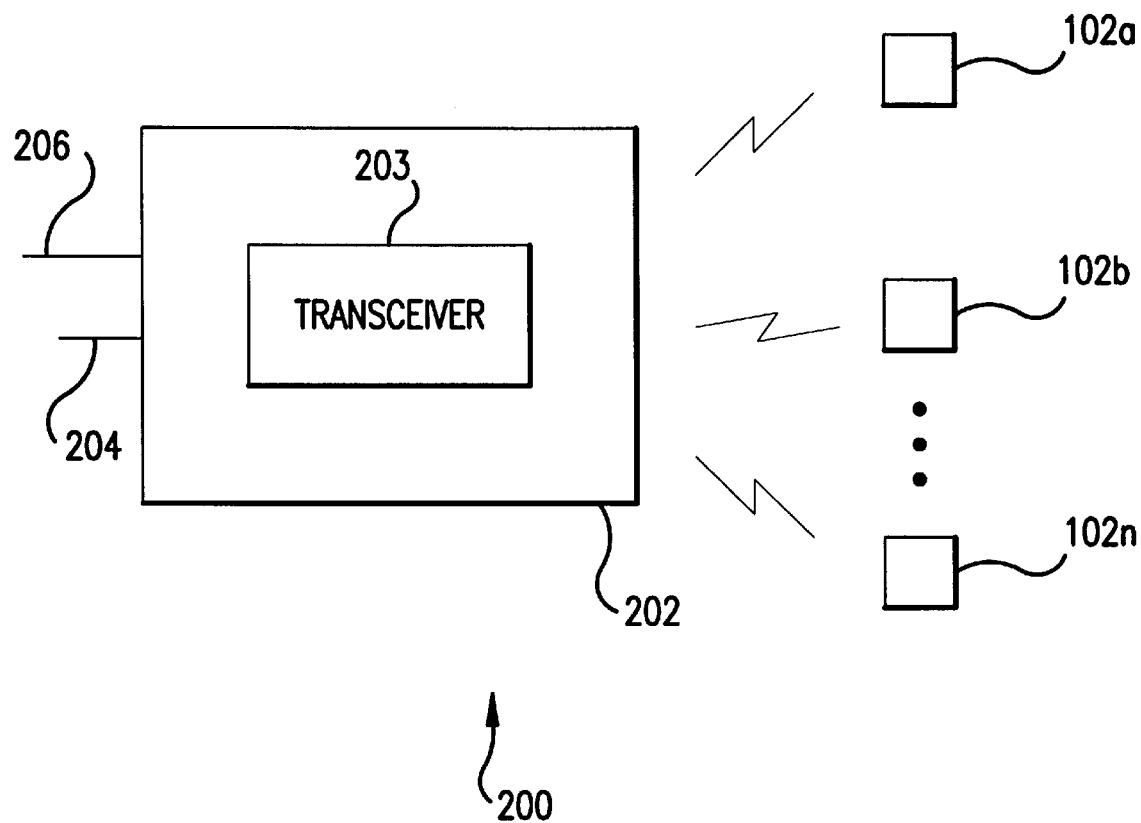
FIG. 2 illustrates an embodiment of a voice-pager system.

The pager 102 is used in a pager system. The pager system permits transmission of messages to, from, and between multiple pagers 102. FIG. 2 illustrates one embodiment of a pager system 200. The pager system 200 includes pagers 102a–n and a paging service 202. The pagers 102a–n are coupled to the paging service 202 by wireless means, such as with the transceivers 106 described above. The paging service 202 necessarily includes a transceiver 203 (similar to transceivers 106 in the pagers 102) so that it can communicate with the pagers 102a–n. The transceivers 106, 203 in the paging service 202 and pagers 102a–n may operate from radio to lightwave frequencies. Furthermore, the transceivers 106, 203 may use spread spectrum modulation to minimize signal interference and enhance the information capacity of a given bandwidth. Spread spectrum modulation including direct sequencing, frequency hopping, time hopping, or a combination thereof, may be used in the present invention.

The paging service 202 could be a part of private branch exchange or other electronics equipment. Messages to and from pagers 102a–n may be sent respectively from and to remote parties using, for example, a pager, cellular telephone, or conventional telephone. To facilitate such delivery, the paging service 202 is coupled to conventional wireless networks 204 and wireline networks 206.

Figure 3:
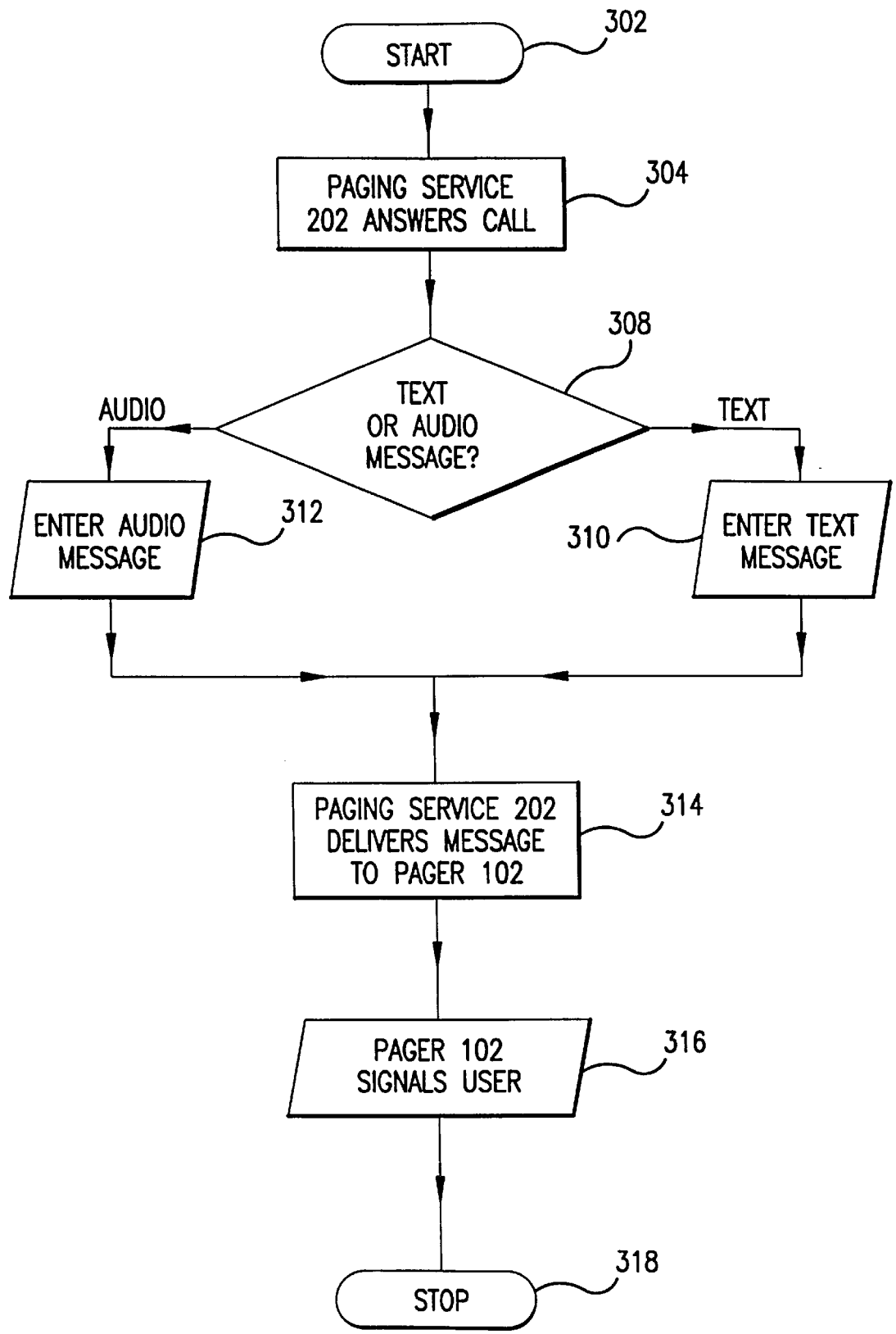
FIG. 3 illustrates an operational embodiment of message transmission to a voice-pager.

An embodiment of operation of the present invention is illustrated in FIG. 3. In this embodiment, a party (not shown) sends a message through the paging service 202 to a pager 102. The party may send the message with a pager 102 or another type of a wireless or wireline communications device, such as telephone or computer, that would be coupled to the conventional wireless and wireline networks 204, 206.

To start, the party contacts the paging service 202 by calling a telephone number associated with the recipient pager 102 (step 302). This may be accomplished, for example, when the party calls the paging service 202 with a telephone. Then the paging service 202 acknowledges the incoming call (step 304). The party then interacts with the paging service 202 in order to send a message to a pager 102. The party must instruct the paging service 202 whether a text or audio message will be sent (step 308). In the event that the party intends to send a text message, the party interacts with the paging service 202 to enter and save an outgoing message in text format (step 310). The text message may be entered with a telephone keypad, a keyboard, or another input device. The message may only comprise the party's telephone number which the recipient should call. If this is the case the party may enter a symbol before or after the telephone number to indicate to the paging service that only a telephone number has been entered. As a result, the recipient's pager will indicate that the page includes such telephone number, as described below.

Alternatively, the party may choose to enter an audio message (step 308). In this event, the party interacts with the paging service 202 to enter and save an outgoing message in audio format (step 312). The audio message may be entered with a microphone 120, or via the telephone keypad.

Subsequently, the paging service 202 delivers the message to the pager 102 (step 314). Typically, delivery is accomplished with wireless technology using transceivers 106, 203 in both the paging service 202 and pager 102 as described above.

Upon receipt of the message, the pager 102 signals the user of the received page with audio-visual alarms (step 316). The audio visual alarms may differ for audio and text messages. For example, the pager 102 may beep once for an audio message and twice for a text message. Also, the display of the pager 102 may show special symbols respectively for the different types of received message formats. For example, to indicate a received voice message, the display may show an ear. To indicate a received text message, the voice message may show an eye. To indicate a received telephone number, the display may show a telephone hand set. Subsequently, the user may retrieve the received message from the pager 102, completing message delivery (step 318). In playing the message, the pager 102 may perform text-to-speech translation.

The present invention contemplates that users may desire to receive messages in a specific format, audio or text. Hence, in one embodiment of the present invention, a user can specify to the paging service 202 that pages be delivered to the user's pager 102 in a specific format, audio or text. This format is stored in a format database, typically present in the paging service 202.

Figure 4:
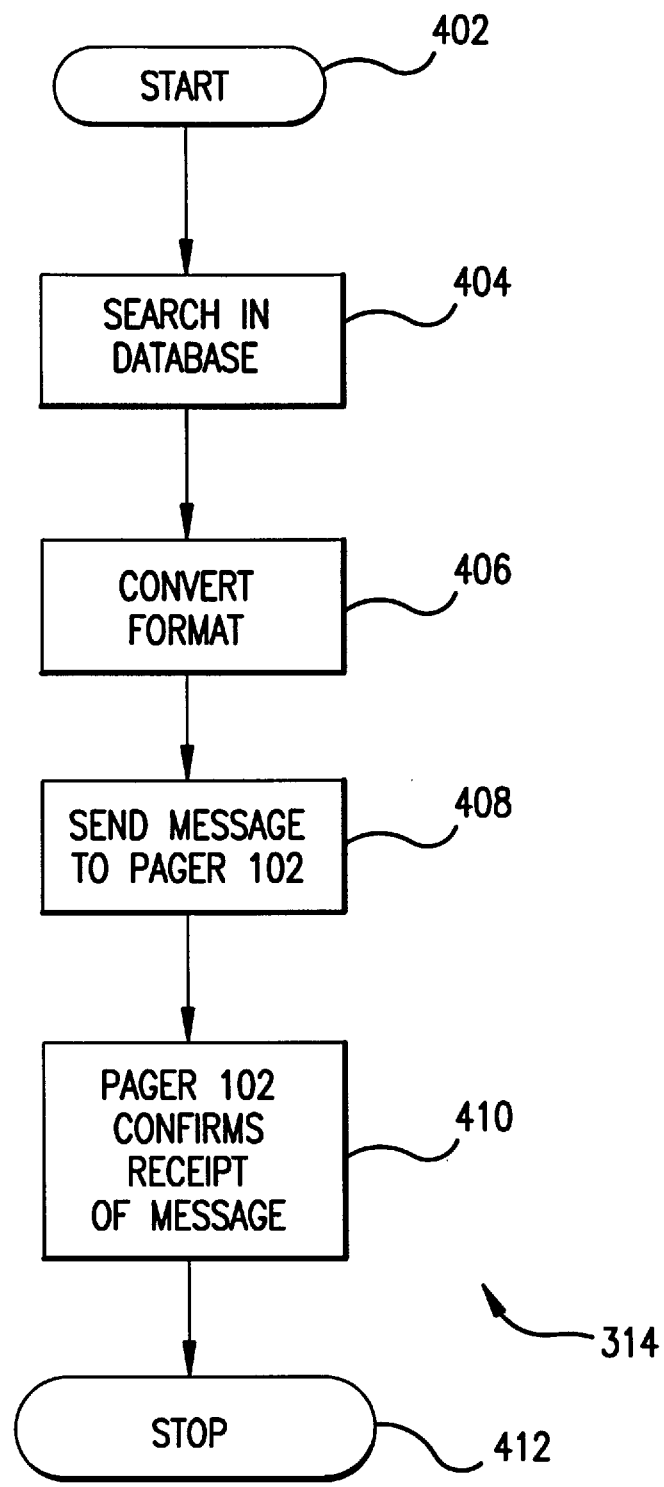
FIG. 4 illustrates an operational embodiment of message format conversion in the present invention.

FIG. 4 illustrates an operational embodiment of message format conversion in the present invention. Upon receipt of a message to be sent to a pager 102 (step 402), the paging service 202 searches the format database. The paging service 202 determines whether the recipient pager 102 user has chosen a preferred format. If the user has entered a preferred format, the paging service 202 will convert the message, if necessary, to that format (step 406). The paging service 202 then sends the message to the pager 102 (step 408), and the pager 102 confirms receipt of the message (step 410). The message is then available to the user of the pager 102, as described above.

Another embodiment of the present invention envisions a first party sending a message from a pager 102 to a second party's pager. The message can be entered in either audio or text format.

Figure 5:
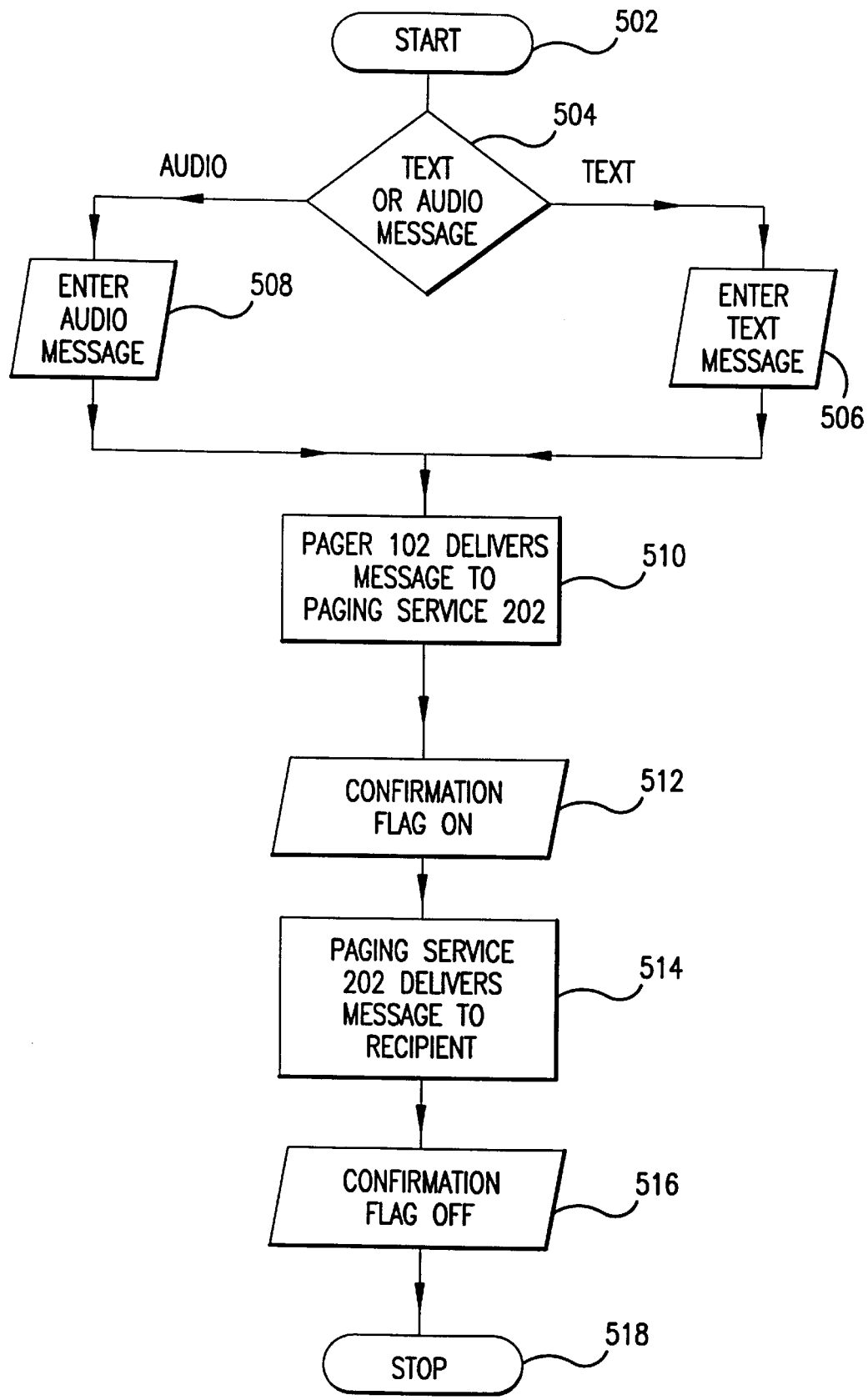
FIG. 5 illustrates an operational embodiment of transmitting a message from a voice-pager to a recipient.

Referring to FIG. 5, the first party must select whether to enter a text or audio message (step 504). If the first party selects a text message, then the first party will subsequently enter the message with a keypad, a keyboard or other device of the pager 102 (step 506). Alternatively, if the first party selects an audio message, then the first party will subsequently enter the message with a microphone 120, or keypad (step 508).

Upon entry of the message, the pager 102 delivers the message to the paging service 202 by the wireless means previously described (step 510). In one embodiment of the present invention, a confirmation flag will then be set in the pager 102 to indicate that the message has been delivered to the paging service 202 (step 512). The confirmation flag may be displayed on the pager 102.

Next, the paging service 202 will deliver the message to the pager of the second party (step 514). The pager 102 of the second party may be part of the paging system 100 of the pager 102 of the first party. In such case, the page will be delivered in a manner described above (step 514). Alternatively, the pager 102 of the second party may be part of another paging system coupled to the paging system 200 of the first party by wireline 204 or wireless 206 means.

Subsequent to the delivery of the message to the pager 102 of the second party, the confirmation flag is reset (step 516). Any corresponding display of the confirmation flag on the pager 102 is terminated. Then the method is complete (step 518).

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of communicating a message from a paging service to a pager, the pager operable to receive and transmit both audio and text messages, comprising the steps of:

enabling an operator of the pager to select a preferred message format, wherein said preferred message format is one of audio and text;

establishing contact between a message originator and the paging service;

enabling said message originator to select a message format for the message, wherein said first message format is one of audio and text;

enabling said message originator to enter the message in said first message format;

converting the message from said first message format to said preferred message format if said preferred message format differs from said first message format; and delivering the message in said preferred message format from the paging service to the pager.

2. The method of claim 1, further including the steps of:

storing said message in a memory on said pager; and generating a message waiting signal on said pager which identifies said preferred message format.

3. The method of claim 1, further comprising the step of signaling said message originator that said message has been received by said paging service.

4. The method of claim 3, further including the step of signaling said message originator that the message has been delivered to said pager.

5. The method of claim 4, wherein said step of signaling said message originator that said message has been received by said paging service includes the step of setting a confirmation flag at said message originator.

6. The method of claim 5, wherein said step of signaling said message originator that said message has been delivered to said pager includes the step of resetting said confirmation flag at said message originator.

7. A paging service comprising:
   receiving means for receiving a message from a message originator, said message having a message format, wherein said message format is one of audio and text;
   a format database for storing a user preferred format chosen by an operator of a pager, wherein said user preferred format is one of audio and text;
   comparing means for comparing said message format to said user preferred format;
   converting means for converting said message from said message format to said user preferred format when said message format and said user preferred format differ; and
   forwarding means for forwarding said message in said user preferred format to said pager.

8. The paging system of claim 7, wherein said message originator is a user at a computer.

9. The paging system of claim 7, wherein said message originator is a user at a telephone.

10. The paging system of claim 7, wherein said message originator is a user of another pager.

11. The paging service of claim 7, wherein said receiving means receives said message from a first pager and said forwarding means forwards said message to a second pager, further comprising:
    confirmation means for sending a confirmation to the first pager to indicate when said message has been received, from the first pager, by said receiving means.

12. The paging service of claim 11, further comprising:
    further confirmation means for sending a further confirmation to the first pager to indicate when said message has been forwarded, to the second pager, by said forwarding means.

13. A pager comprising:
    page receiving means for receiving incoming messages from a paging service;
    page sending means for sending outgoing messages to said paging service;
    a memory for storing said incoming and outgoing messages, wherein said incoming and outgoing messages have a message format, and wherein said message format is one of audio and text;
    a microphone for entering outgoing messages having said audio message format;
    a speaker for playing incoming messages having said audio message format;
    a keypad for entering outgoing messages having said text format;
    a display for displaying incoming messages having said text format; and
    translations means for translating incoming messages from said text message format to said audio message format.

14. The pager of claim 13, further comprising:
    further translation means for translating incoming messages from said audio message format to said text message format.

15. The pager of claim 13, wherein:
    said receiving means includes means for receiving a confirmation indicating that an outgoing message from the pager has been delivered to said paging service.

16. The pager of claim 15, further comprising:
    a confirmation flag for indicating that said confirmation has been received.

17. The pager of claim 16, further comprising:
    confirmation display means for displaying said confirmation flag.

18. The pager of claim 17, further comprising:
    means for resetting said confirmation flag subsequent to delivery of said message from said paging service to a recipient.

* * * * *